United States Patent [19]

Eisenberg

[11] Patent Number: 5,130,921
[45] Date of Patent: Jul. 14, 1992

[54] DIGITAL CONTROLLER FOR SCANNED ACTUAL CONDITION SIGNALS

[75] Inventor: Gerd Eisenberg, Rossdorf, Fed. Rep. of Germany

[73] Assignee: BTS Broadcast Television Systems GmbH, Darmstadt, Fed. Rep. of Germany

[21] Appl. No.: 728,015

[22] Filed: Jul. 8, 1991

Related U.S. Application Data

[63] Continuation of Ser. No. 194,810, May 17, 1988, abandoned.

[30] Foreign Application Priority Data

Jun. 12, 1987 [DE] Fed. Rep. of Germany ....... 3719581

[51] Int. Cl.$^5$ ............... G05B 13/02; G06F 7/48; G06F 1/02
[52] U.S. Cl. ..................... 364/162; 364/750.5
[58] Field of Search ............... 364/750.5, 162

[56] References Cited

U.S. PATENT DOCUMENTS

| | | | |
|---|---|---|---|
| Re. 33,267 | 7/1990 | Kraus | 364/158 |
| 4,232,364 | 11/1980 | Bibbero | 364/162 |
| 4,337,518 | 6/1982 | Ohnishi et al. | 364/724.17 |
| 4,424,559 | 1/1984 | Lorincz et al. | 364/131 |
| 4,454,590 | 6/1984 | Belt et al. | 364/750.5 |
| 4,545,009 | 10/1985 | Muraki et al. | 364/164 |
| 4,549,123 | 10/1985 | Hägglund et al. | 364/162 |
| 4,558,430 | 12/1985 | Mogami et al. | 364/162 |
| 4,580,208 | 4/1986 | Sukimoto et al. | 364/162 |
| 4,602,326 | 7/1986 | Kraus | 364/158 |
| 4,754,391 | 6/1988 | Suzuki | 364/162 |
| 4,788,647 | 11/1988 | McManus et al. | 364/494 |

Primary Examiner—Gareth D. Shaw
Assistant Examiner—Matthew C. Fagan
Attorney, Agent, or Firm—Frishauf Holtz Goodman & Woodward

[57] ABSTRACT

Sequentially scanned digital input signals are applied to the controller to derive output signals which are formed of the sum of scanned values of the signals weighted with selected coefficients. The weighting with the coefficients is carried out by use of coefficients stored in a table, for example a read-only memory (3, 16); the sum of the respectively weighted signals is then formed in a sequential adder (4, 5; 23, 26, 24, 25). Multiplex operation of respective signals, associated with selected coefficient addresses, can be obtained.

6 Claims, 3 Drawing Sheets

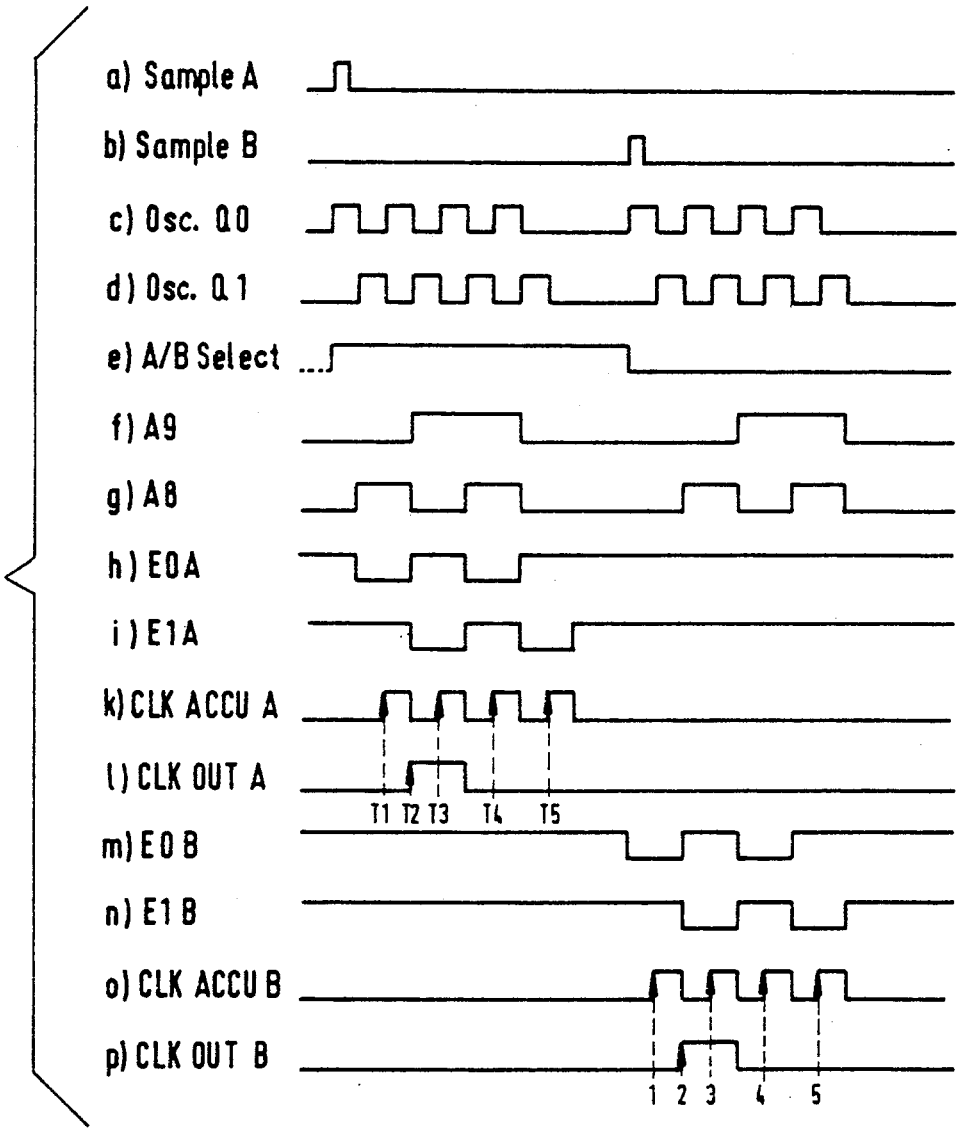

DIGITAL CONTROLLER FOR SCANNED ACTUAL CONDITION SIGNALS

This application is a continuation of application Ser. No. 07/194,810, filed May 17, 1988, now abandoned.

Reference to related application, by the inventor hereof, assigned to the assignee of the present invention, the disclosure of which is hereby incorporated by reference:

U.S. Ser. No. 194,809, filed May 17, 1988, EISENBERG, now U.S. Pat. No. 4,903,283, issued Feb. 20, 1990.

U.S. Ser. No. 194,811, filed May 17, 1988, EISENBERG, now U.S. Pat. No. 4,874,994, issued Oct. 17, 1989.

The present invention relates to a controller receiving scanned digital input signals and providing output signals formed as the sum of scanned input signals which are weighted with different coefficients and, if desired, with a value of a prior output signal, also weighted with a selected coefficient, and to a method of generating output signals. As the above cross-referenced related U.S. Pat. No. 4,874,994 makes clear, a controller is a device for use with controlled element, for example to control a mechanically or electromechanically driven rotary movement.

BACKGROUND

The transfer function of a controller, in digital controllers which process scanned signals, is determined by a control algorithm, which frequently requires a considerable amount of processing time and processing equipment. For example, the control algorithm of a proportional-integral-differential (PID) controller is:

$$u(k) = u(k-1) + q_0 e(k) + q_1 e(k-1) + q_2 e(k-2) \quad (1)$$

wherein
- u is a positioning value or magnitude;
- e the control deviation or error magnitude;
- $q_0$, $q_1$ and $q_2$ are coefficients determining the condition of the controller;
- k determines a scanning instant;
- k−1 the next preceding scanning instant; and
- k−2 the twice removed prior scanning instant.

Controllers of this type have used such microprocessors which, however, in the past have required unduly long calculating time periods.

THE INVENTION

It is an object to provide a digital scanning control system of a proportional-integral-differential (PID) controller operating to control a controlled element; and in which high scanning frequencies can be used, which operates rapidly, and which can be easily and inexpensively manufactured.

Briefly, a plurality of coefficients are stored in tabular form. The respectively selected coefficients are then applied to the respective input signals to form weighted input signals and the sums of the weighted input signals are then added. The value of a prior output signal can also be determined and a signal representative thereof obtained and, after weighting with a desired coefficient, added to the sum of the weighted input signals.

The arrangement has the advantage that the control parameters can be easily changed by one or more signals being applied. The system can be readily used in multiplex mode.

DRAWINGS SHOWING ILLUSTRATIVE EXAMPLES

FIG. 3 is a timing diagram illustrating, in aligned graphs a to p, pulses and signals arising in the system of the present invention; and FIG. 4 is an abbreviated table illustrating computation steps.

DETAILED DESCRIPTION

Figure 1:
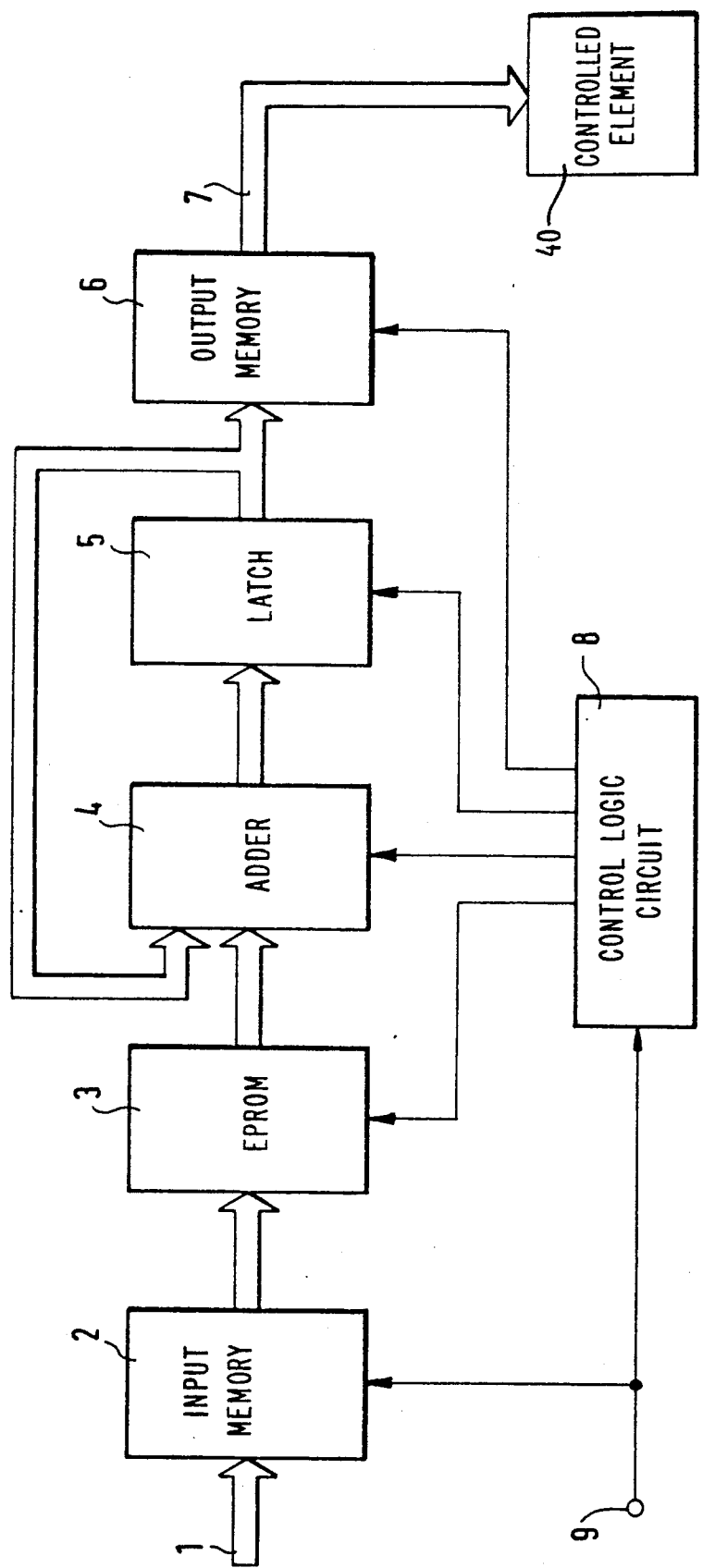
FIG. 1 is a highly schematic simplified block diagram of a system in accordance with the invention.
Figure 2:
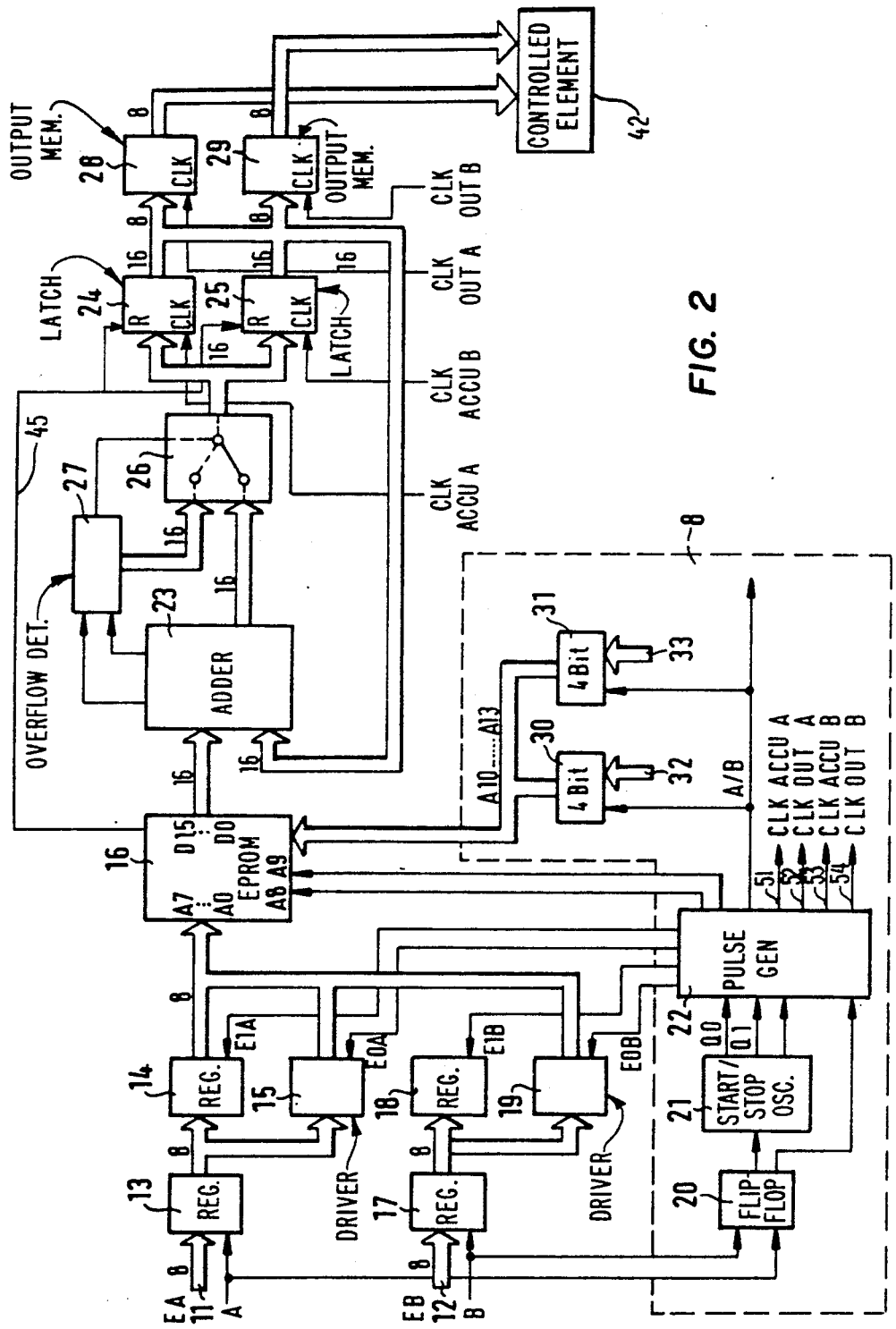
FIG. 2 is a more detailed block circuit diagram of another embodiment of the invention.

The system of FIG. 1 illustrates the arrangement in general; a detailed description of the invention will then follow, with reference to FIGS. 2 and 3.

The input 1 receives a control deviation in form of an 8-bit digital signal. An input or buffer memory 2 stores two sequential values of the control deviation, so that a current value and a preceding value, that is, two values, are simultaneously available. These two values are sequentially applied to address inputs of an electronically programmable read-only memory (EPROM) 3. Two further binary digits are applied from the control logic 8, which contain the information regarding the coefficient with which the respective value is to be multiplied. In dependence on the respective address, the product from the EPROM 3 is provided. To obtain suitable accuracy, the product is available as a 16-digit number. The adder 4 adds the respective addend to the contents within a latch 5. When this has been carried out, the result is entered in an output memory 6, from the output 7 or which a positioning value can be obtained for controlling a controlled element 40. The temporal control is effected by a control logic 8. Synchronization is obtained from clock or scanning pulses applied at terminal 9.

The basic system can be expanded as shown in the detailed example of FIG. 2. Further, the system of FIG. 2 permits dual function operation in multiplex mode.

FIG. 2 illustrates the basic blocks shown in FIG. 1 in greater detail. Two inputs 11, 12 receive input signals EA and EB, respectively, each of which represents an 8-bit signal, and representative of a control deviation. Scanning pulses A and B occur, offset from each other, but both synchronously with respect to a scanning word. Two registers 13, 14 are provided for the respective data EA and EB. The output of the first register 13 is connected via a driver 15 having a tri-state output to the output of a register 14 and then to the address inputs A7 to A0 of the EPROM 16. The components connected to the input 12 are similar. Thus, data EB are connected to two registers 17, 18 and, likewise, a driver 19 similar to driver 15, is provided, and similarly connected.

The control logic 8 (FIG. 1) includes a flip-flop 20, the state of which depends on the occurrence of either a scanning pulse A or B, respectively. The flip-flop (FF) 20 then starts a start/stop oscillator 21 which generates a scanning clock pulse sequence required within the controller. This clock pulse as well as the output signal from FF 20 are applied to a pulse generator 22, which provides pulses to be described in connection with FIG. 3. Some of those pulses are used for the registers 14, 18 and the drivers 15 and 19 to form read-out control pulses.

In operation, the first received respective signal EA or EB is processed; the second received signal is processed thereafter.

FIG. 3 illustrates, in graphs a and b, the scanning or sampling pulses A and B. Since the sample pulse B occurs after the sampling pulse A, the oscillator 21 is started by the scanning or sampling pulse A and, as seen in graphs c and d, carries out four oscillations which have a frequency substantially higher than the frequency of the input signals of the sampling signals A or B.

In essence, the pulse generator 22 includes counting and logic circuits to derive the pulses furnished by the oscillator 21 and the FF 20. As seen in line e, the pulse denominated "A/B-select" which is connected to the inputs A and B activates the components necessary for the respective input signal EA and EB, separately. The pulse generator 22 the oscillator 21 and the flipflop 20 and their connections to other components constitute a digital scanning and control system.

The signals shown in lines f and g form the two digits A8, A9 of the addresses of the EPROM 16, with which the respective coefficient can be selected. Lines h, i as well m and n represent the signals E0A, E1A, E0B and E1B which control the read-out of the data from the registers 14 and 18 and from the drivers 15 and 19.

The output data of the EPROM 16 are applied to a 16-bit adder 23, the other input of which is coupled to outputs of two latches 24, 25, which together with the adder 23 form an accumulator. Each one of the latches are provided for, respectively, the input signals EA, EB. A transfer switch 26 is provided between the output of the 16-bit adder 23 and the inputs to latches, controlled by an overflow detector 27. The overflow detector 27 controls the switch 26 upon overflow in either direction, that is, upon overflow of the adder in positive direction as well as when passing of a value line or value number provided for the transfer switch, by moving the transfer switch in the upper, broken-line position. In dependence on exceeding, or passing below, a predetermined value range, the upper or lower limiting value is then supplied over the switch to the input of the latches 24, 25. An output register 28, 29 is provided for supplying the respective positioning values to a controlled element 42.

The latches 24, 25 are clocked by the respective signals CLK ACCU A and CLK ACCU B, as shown in FIG. 3 in graphs k and o, respectively, from first sources 51 and 53 of clock pulses. The output registers 28, 29 receive a clock signal shown in line 1 and p of FIG. 3 from respective second sources 52 and 54 of clock pulses. This makes it possible to clock the output registers for content holding intervals which are different from the intervals at which the latches 24 are clocked.

Two 4-bit registers 30, 31 have outputs coupled to the address inputs A10 to A13 of the EPROM 16. These inputs permit selection from data stored in the EPROM representative of various characteristics of the controller. The input signals EA and EB, respectively, each have a 4-bit register which each receive from respective inputs 32, 33 data corresponding to the respective characteristics of the controller. To read out the respective value for the address positions A10 to A13, associated with the respective input signal EA and EB, respectively, registers 30, 31 are controlled by the signal "A/B-select" (FIG. 3, graph e).

OPERATION

It has been assumed that the sampling pulse A (graph a of FIG. 3) occurs before the sampling pulse B. Consequently, input signal A is processed first. "A/B-select" will switch to binary 1 and pulses A8, A9 as well as E0A and E1A are formed. E0A and E1A control application of sequentially following sampling values from register 14 and driver 15 to the address inputs of the EPROM 16. The addend read out from the EPROM 16 is applied over the adder 23 and the transfer switch 26 to the input of the latch 24. At that time, only the latch 24 received clock pulses. At time T1 (FIG. 3, graphs k and l), that is, at the time of the leading flank of the first clock pulse, the just formed addend Q0. E(K) is added to the previous content of the accumulator. At time T2, and as shown in line 1 of FIG. 3, the output register 28 receives a clock pulse and thus the content of the latch is transferred into the output register.

At the time of the subsequent positive flank T3 of the clock pulse for the latch 24, nothing will be added to the accumulator content if the value 00H is read out from the EPROM by the content characterized by the address positions A8 and A9. In this case, in connection with further computer steps, an integrating condition will be formed. If, however, from register 30 a signal FFH is read from the EPROM, then the content of the latch is set to zero, by the connections 45, which will cause proportionality behavior.

At the time of the fourth clock pulse T4, the next addend is added to the preceding accumulator content. At time T5, the addition of the third addend is carried out. When these steps are worked off, the positioning value of the input signal EB is then calculated.

The respective computation steps are shown in FIG. 4 in form of a table. ACCU represents the content of the latch.

In an illustrative embodiment, the following components were used:
flip-flop 20: (74LS74)
start-stop oscillator 21: (74LS221), 15 (74LS165)
pulse generator 22: 37, 49, (3×74LS74)
register 30: (74HCT 574)
register 31: (74HCT 574)

As can be seen, the control logic 8 (FIG. 1) includes a plurality of stages, which can be constructed of well known integrated circuits.

The sequential addition of data in the respective registers, weighted with the q factors, see the equation (1) above, thus solves the equation (1) in a simple and effective manner.

I claim:

1. A digital controller for controlling a controlled element (40; 42) in accordance with a proportional-integral-differential (PID) transfer function, said digital controller having a control logic circuit (8) which includes a digital scanning and control system (20, 21, 22) including means for timing digital sample presentation intervals, said digital controller for producing a positioning magnitude u(k) for each sample presentation interval for application to said controlled element (40; 42), said positioning magnitude being produced in accordance with the formula $$u(k) = u(k-1) + g_0 e(k) + g_1 e(k-1) + g_2 e(k-2)$$

- wherein the parenthetical expressions designate time, by successive ones of said sample presentation intervals, whereby k is a current or latest sample presentation interval;

k−1 is a sample presentation interval next preceding the current or latest sample presentation interval;

k−2 is a prior sample presentation intervals twice removed from the current or latest sample presentation interval; and wherein u is a positioning magnitude;

e is a control error magnitude;

$g_0, g_1, g_2 \ldots$ are control coefficients selected by said control logic circuit (8) in response to control by said digital scanning and control system (20, 21, 22) for weighting respective control error magnitudes;

said digital controller comprising, in addition to said control logic circuit (8):

read-only-memory means (3; 16), coupled to at least one source (EA11; EB12) of control error magnitudes and to said control logic circuit (8), for storing product magnitudes, said read-only-memory means having first and second address inputs for respectively receiving said control error magnitudes from said at least one source of control error magnitudes and address values representative of control coefficients from said control logic circuit, and having an output at which said product magnitudes are outputted as weighted control error magnitudes;

means (2; 13, 14, 15, 17, 18, 19), coupled to said at least one source of control error magnitudes and to said read-only-memory means, for storing latest and preceding control error magnitudes and for furnishing said latest and preceding control error magnitudes to said first address inputs of said read-only-memory means;

sequential adding means (4, 5; 23, 24, 25), coupled to said read-only-memory means, to said control logic circuit, and to said controlled element, comprising an adder (4; 23) and a latch (5; 24, 25) for storing positioning magnitudes until superseding positioning magnitudes have been accumulated and outputted by said adder, said latch having an input coupled to said adder and having an output for outputting positioning magnitudes to said controlled element and to said adder, said adder having a first input connected to said output of said read-only-memory means for receiving said weighted control error magnitudes and a second input connected to said output of said latch for receiving previous positioning magnitudes, whereby said adder produces superseding positioning magnitudes.

2. The digital controller of claim 1, wherein the sequential means (4, 5; 23, 24, 25) include an output memory (6; 28, 29) coupled between the latch and the controlled element and connected for clocking by a first source of clock pulses from said digital scanning and control system, at intervals different from those at which the latch is clocked, the latch being connected for clocking by a second source of clock pulses from said digital scanning and control system.

3. The digital controller of claim 2, wherein each of said product magnitudes stored in said read-only-memory means represent the product of one of said control error magnitudes at said first address inputs and one of said control coefficients represented by address values at said second address inputs.

4. The digital controller of claim 3, wherein said means (2; 13, 14, 15, 17, 18, 19) for storing latest and preceding control error magnitudes, said latch (5; 24, 25), and said output memory (6; 28, 29) together include at least one set of the same number of memory means (13; 14, 17, 18; 24, 25; 28, 29) wherein each memory means of each of said at least one set is associated in a cyclical manner with sequentially arriving control error magnitudes; and wherein said digital scanning and control system (20, 21, 22) controls a cyclically sequential operation of the read-only-memory means and the sequential adding means in an identical order of cyclical sequence with said each of said memory means of each of said at least one set of memory means.

5. The digital controller of claim 3, wherein said control logic circuit further outputs additional address bits (A8, A9) to said read-only-memory means for selectively outputting no weighted control error magnitudes from said read-only-memory means, thereby eliminating integrating controller behavior.

6. The digital controller of claim 5, wherein said read-only-memory means is further coupled to said latch and wherein said control logic circuit outputs said additional address bits (A8, A9) to said read-only-memory means for selectively clearing the contents of said latch, thereby providing proportionality behavior of the digital controller.

* * * * *